United States Patent [19]

Kuhnle et al.

[11] 4,317,495
[45] Mar. 2, 1982

[54] DEVICE FOR PROTECTING A FLEXURAL FORCE RECEIVER AGAINST OVERLOADING

[75] Inventors: Ernst Kuhnle; Josef Schwarz, both of Balingen, Fed. Rep. of Germany

[73] Assignee: Bizerba-Werke Wilhelm Kraut KG, Fed. Rep. of Germany

[21] Appl. No.: 183,390

[22] Filed: Sep. 2, 1980

[30] Foreign Application Priority Data

Sep. 7, 1979 [DE] Fed. Rep. of Germany ....... 2936110

[51] Int. Cl.$^3$ ............................................. G01G 21/10
[52] U.S. Cl. .................................... 177/157; 177/188; 177/229
[58] Field of Search ........ 177/154, 155, 156, 184–189, 177/211, 229, 246

[56] References Cited

U.S. PATENT DOCUMENTS

| 3,561,553 | 2/1971 | Blubaugh | 177/229 X |
| 4,058,179 | 11/1977 | Price | 177/156 |
| 4,170,270 | 10/1979 | Sette | 177/229 X |

Primary Examiner—Joseph W. Hartary
Attorney, Agent, or Firm—Olsen and Stephenson

[57] ABSTRACT

In a weighing machine a flexure bar is attached as a cantilever to a beam. The force to be measured is applied to the cantilever end of the flexure bar by a weighing lever. In order to protect the flexure bar against overloading the beam is mounted to be pivotable and is held by a spring force acting counter to the direction of action of the force to be measured against a first fixed stop. The spring force is chosen such that said beam moves out of contact with the first stop when an overload is applied to the weighing lever. In addition, a second fixed stop is provided to restrict the pivotal movement of the weighing lever and thus prevent the transmission of further force into the flexure bar.

7 Claims, 3 Drawing Figures

DEVICE FOR PROTECTING A FLEXURAL FORCE RECEIVER AGAINST OVERLOADING

BACKGROUND OF THE INVENTION

The present invention relates to a device for protecting a flexural force receiver against overloading, particularly in weighing machines, in which a flexural force receiver is attached cantilevered at one end to a beam and the force to be measured is applied to the cantilevered end of the flexural force receiver.

The range within which flexural force receivers, particularly flexure bars, can be loaded beyond a prescribed maximum load without consequent damage, is relatively narrow. For customary commerical flexure bars it lies between 30 and 150% of the rated load. In weighing machines (balances or scales) an overload frequently occurs which may rise to 10 or more times the rated load, so that the need exists to protect the flexural force receiver from overloading or excessive bending.

Because of the short measurement stroke of the customary flexure bars, which is e.g., approximately 0.2 to 0.5 mm for a rated load of 10 kg, it is difficult to realise a rigid or stationary limit stop restricting the bending of the bar. Firstly the precise adjustment of such a stop presents problems and secondly with such short distances it is possible for faults to occur solely due to dirt.

In order to overcome these difficulties it is known to incorporate an auxiliary spring or other elastic intermediate element into the force introducing element of a flexure bar as overload protection means. When the flexure bar is loaded this elastic intermediate element expands by a considerably greater degree than the actual measurement stroke of the flexure bar, so that it is then possible to provide a fixed stop against which a specific part of the force introduction system strikes when the force introduced exceeds the rated load of the flexure bar.

However, these known constructions of overload protection devices for flexural force receivers have the following disadvantages: If the elastic intermediate element, e.g., a helicoidal spring, is made extremely soft, it is possible due to the comparatively great expansion range which can thereby be achieved to provide a precisely adjustable overload stop which allows sufficiently great play so that no faults can occur due to dirt, elastic deformations or other changes. However, the additional stroke dictated by a soft spring creates technical disadvantages for weighing, and in many cases cancels the peculiar advantage of virtually strokeless measurement by flexural force receivers. Moreover the incorporation of a soft auxiliary spring in a balance necessitates additional height, as a result of which one of the principal advantages of a flexure bar, namely the achievement of low height, becomes lost.

It is an object of the present invention to provide an overload protection device which permits a sufficiently great play towards a fixed stop but does not increase the height of the arrangement as is the case with the conventional interposition of a relatively soft elastic intermediate element.

SUMMARY OF THE INVENTION

According to the present invention there is provided a device for protecting a flexural force receiver against overloading, comprising a beam and a flexural force receiver attached cantilevered at one end of said beam, flexural force being applied to the cantilever end of the flexural force receiver, wherein said beam is movable and is pretensioned counter to the direction of action of the flexural force against a first fixed stop; the value of the pretension being chosen so that the beam moves out of contact with the first stop counter to the pretension when the flexural force receiver is overloaded; and a second fixed stop is provided which prohibits the introduction of further force into the flexure bar.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
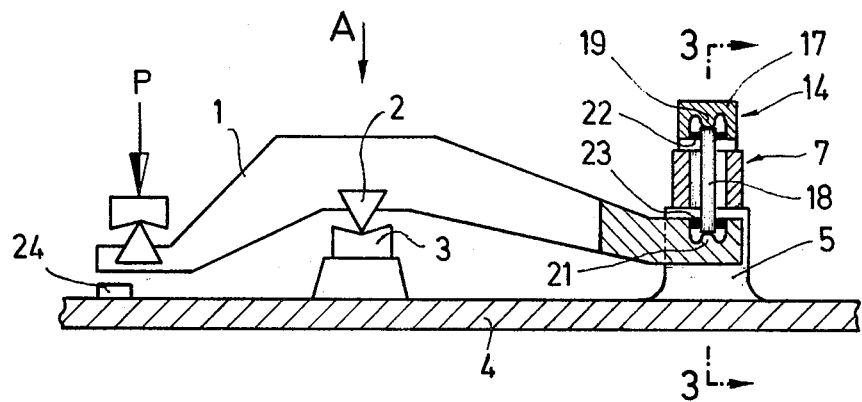
FIG. 1 shows schematically a lever of a weighing machine for introducing a force into a flexure bar, partly sectioned along the line 1—1 of FIG. 2.
Figure 2:
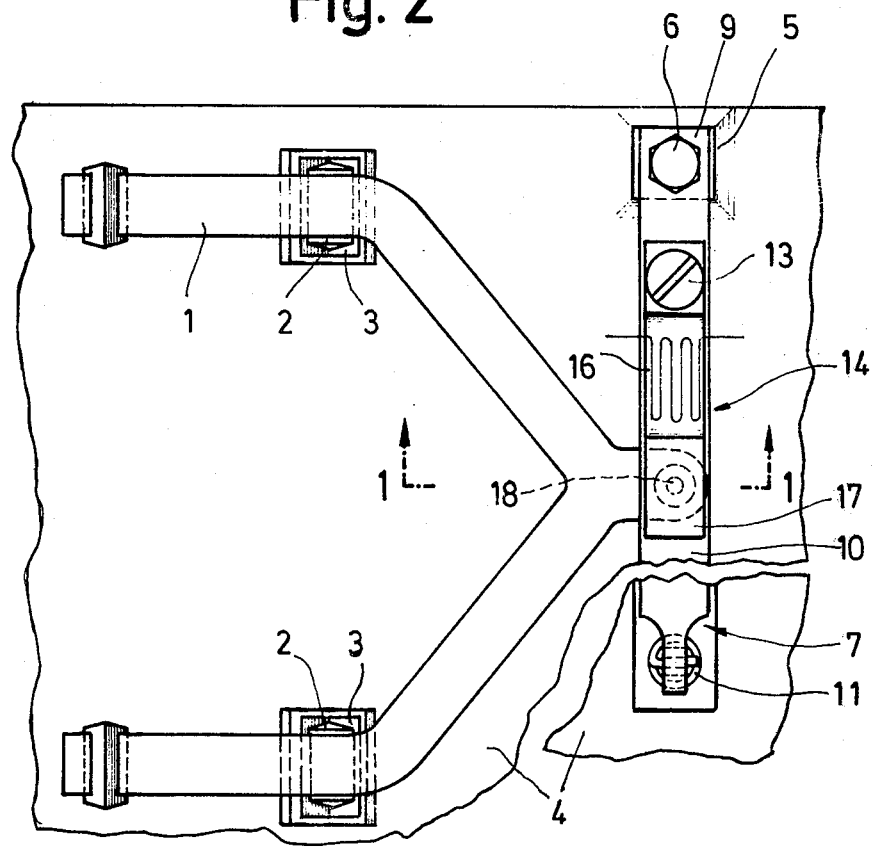
FIG. 2 shows a plan of the arrangement of FIG. 1 in the direction of arrow A.
Figure 3:
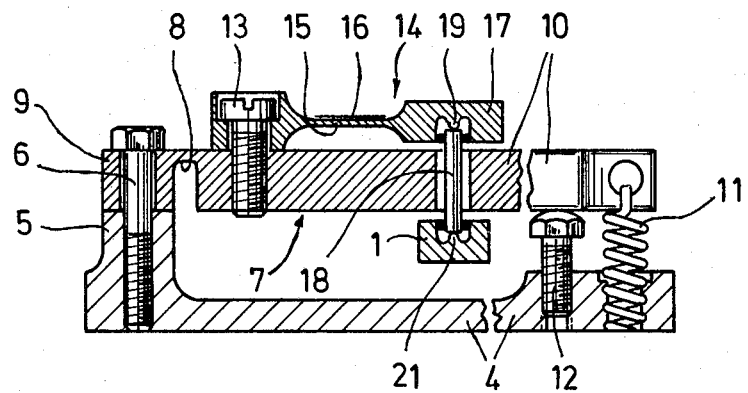
FIG. 3 shows a section taken along line 3—3 of FIG. 1.

A bifurcated weighing lever 1 (FIGS. 1 and 2) is mounted pivotably by knife-edges 2 and bearings 3 on a fixed frame 4. A force P to be measured is introduced in conventional manner by means of knife-edges and bearings at the end of the weighing lever 1 on the lefthand side as seen in FIGS. 1 and 2. A beam 7 is attached cantilevered by means of a screw 6 to a bracket 5 of the frame 4 (FIG. 3). The beam 7 comprises two sections 9 and 10 connected by a notch 8. The section 9 forms the stationary mounting of the beam 7, whilst the section 10 of the beam 7 carries a flexural force receiver in the form of a flexure bar 14 which is described further hereinafter. The notch 8 enables the beam section 10, when appropriately loaded, to be pivoted relative to the beam section 9. In this respect, the beam section 10 acts as a lever.

A tension spring 11 is hooked into a transverse bore which is provided at the free end of the beam section 10. The spring 11 is arranged to be screwed in a screwthreaded bore provided in the frame 4 and draws the beam section 10 against an adjustable stop 12 which is in the form of a screw received in a screwthreaded bore in the frame 4. The pretension of the spring 11 may be varied by screwing the spring 11 in its bore such that the initial tension on the beam section 10 can be adjusted.

The flexure bar 14 is attached cantilevered at one end to the beam section 10 by means of a screw 13. On the region 15 of the flexure bar 14 which bends under load, an extensometer strip 16 is stuck in conventional manner and may be connected by connecting leads in known manner to an electronic evaluating device.

The force transmitted through the weighing lever 1 is introduced from beneath into the free end 17 of the flexure bar 14. The force is transmitted through a rigid connecting piece 18 which rests by its end faces upon small ball heads 19, 21 in the free end 17 of the flexure bar 14 and in the free end of the weighing lever 1 and extends through a bore in the beam 7. Elastic sleeves 22, 23 act to fix the connecting piece 18 in both the flexure bar and the weighing lever.

As can be seen from FIG. 1, stops 24 which restrict the pivotal range of the weighing lever 1 are provided on the frame 4.

The device described functions in the following manner: When a force P to be measured is introduced, the weighing lever 1 pivots and, through the connecting piece 18, urges the free end 17 of the flexure bar 14 upwardly as seen in FIGS. 1 and 3. The resulting deformation of the flexure bar 14 causes a variation in the resistance of the extensometer strip 16, which is utilized in known manner to determine the force P. The spring 11 is so strongly pretensioned that for loadings of the flexure bar 14 within the admissible load range the beam 7 rests rigidly and immovably upon the fixed stop 12. However, if the force P becomes greater than admissible, the correspondingly adjusted spring 11 yields and the beam section 10, acting as a lever, lifts from the stop 12 until the weighing lever 1 rests upon the stops 24 integral with the frame. After this no further force can be introduced into the beam 7 and the flexure bar 14. The introduction of the force to be measured into the flexure bar 14 and the bending of the latter upwardly attains a limit when the rated load of the flexure bar has been reached and the correspondingly adjusted spring 11 commences to expand.

By means of the arrangement illustrated, the essential advantage is achieved compared to known overload protection means, that an auxiliary stroke, which can be intercepted by a stop integral with the frame (stops 24) occurs at the beam 7 only after the rated load is exceeded. In contrast to known overload protection means in which the force to be measured is introduced permanently through a soft spring into the flexure bar, in a construction of the invention only the extremely slight bending of the flexure bar 14 develops, which leads to stroke variations of the order of magnitude of 0.2 to 0.5 mm. When the overload range is reached the space between the weighing lever 1 and the stops 24 is still sufficiently great for appropriate adjustments to be performed and to reliably eliminate faults due to dirt etc. Overall, therefore, the overload protection device of the invention requires practically no additional height.

The spring 11 has a force increase/stroke ratio which is lower than that of the flexure bar 14, i.e., the spring 11 consequently has a flatter characteristic, so that when the admissible maximum load is exceeded the spring 11 yields with a long spring stroke until the weighing lever 1 rests upon the stops 24.

In an alternative embodiment of the invention the beam 7 as a whole may be constructed as a spring element, e.g., as a leaf spring, and be pretensioned so that it rests upon the stop 12 with the required pretension. Under certain conditions this may also be achieved solely by the elasticity which the bar-shaped beam 7 acquires by the construction of the notch 8. Where the beam 7 has elasticity the spring 11 may be omitted. In all these cases, the lifting of the beam 7 from the stop 12 is determined by an appropriate adjustment of the screw constituting this stop.

In the embodiment of the invention illustrated the force is introduced into the flexure bar 14 upwardly from below and the spring 11 and draws the beam 7 downwardly. In other embodiments these directions may be reversed.

We claim:

1. Device for protecting a flexural force receiver against overloading, comprising a beam and a flexural force receiver attached cantilevered at one end of said beam, flexural force being applied to the cantilever end of the flexural force receiver, wherein said beam is movable and is pretensioned counter to the direction of action of the flexural force against a first fixed stop; the value of the pretension being chosen so that the beam moves out of contact with the first stop counter to the pretension when the flexural force receiver is overloaded; and a second fixed stop is provided which prohibits the introduction of further force into the flexure bar.

2. Device according to claim 1, wherein said beam is formed as a lever and is pressed against the first stop by a spring.

3. Device according to claim 2, wherein the pretension of said spring is adjustable.

4. Device according to claim 1, wherein the position of the first stop is adjustable.

5. Device according to any of claims 1 to 4, wherein said beam comprises two beam sections articulately connected by a notch, one of the beam sections being retained stationary and the other of the beam sections carrying the flexural force receiver and abutting with pretension against the first stop.

6. Device according to any of claims 1 to 4, wherein the beam is itself constructed as a spring element which abuts against the first stop with inherent pretension.

7. Device according to claim 1, wherein a pivotable weighing lever is arranged to introduce the flexural force into the flexural force receiver and the second stop is arranged in the pivotal range of said weighing lever.

* * * * *